April 4, 1939.  W. E. AESCHBACH  2,152,833
FABRIC MEASURING MACHINE
Filed Dec. 27, 1937  4 Sheets-Sheet 1

Inventor
Walter E. Aeschbach
By
Liverance & Van Antwerp
Attorneys

April 4, 1939.　　　W. E. AESCHBACH　　　2,152,833
FABRIC MEASURING MACHINE
Filed Dec. 27, 1937　　　4 Sheets-Sheet 3

Inventor
Walter E. Aeschbach
By Liverance & Van Antwerp
Attorneys

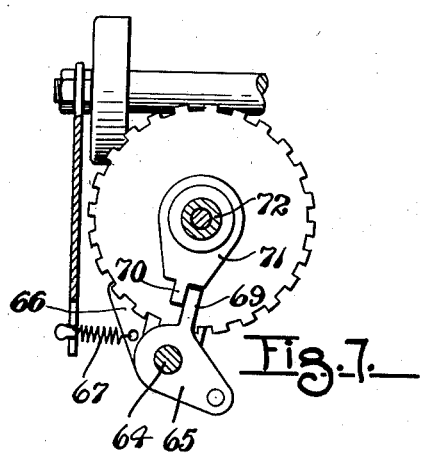
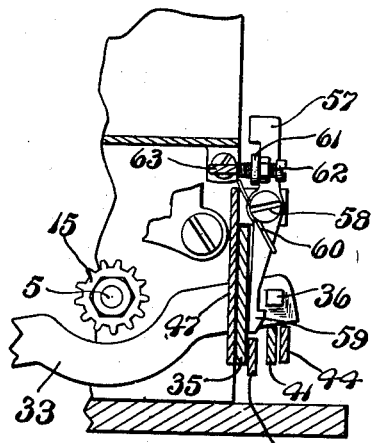
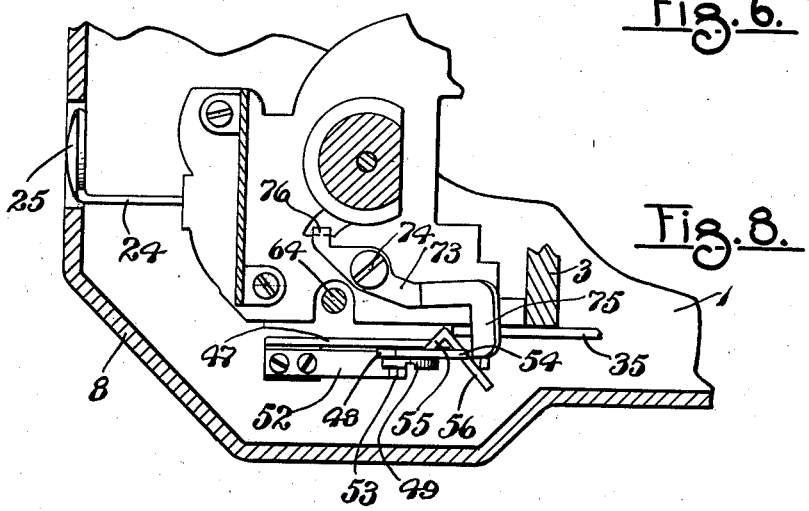
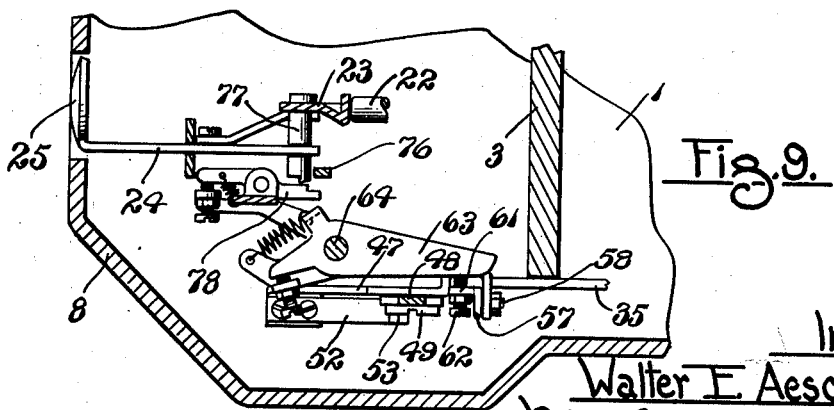

Patented Apr. 4, 1939

2,152,833

UNITED STATES PATENT OFFICE 2,152,833

FABRIC MEASURING MACHINE

Walter E. Aeschbach, St. Louis, Mo., assignor to The Measuregraph Company, St. Louis, Mo., a corporation of Missouri Application December 27, 1937, Serial No. 181,740

13 Claims. (Cl. 101—74)

This invention relates to fabric measuring machines in which cloth, ribbon or similar fabrics may be drawn between rollers, the movement of the cloth rotating the rollers. One of the rollers, known as the measuring roller, connects with and drives indicating mechanism as the roller is rotated, which informs the clerk operating the machine of the length of cloth drawn through the machine from the start of measuring until the operation has been stopped. Such machines also in many cases have connected therewith a computing chart simultaneously operated with the indicator to bring into view successively tabulated columns of cost of measured lengths of cloth at a large number of prices, thus showing computations at such plurality of prices for any measured length of cloth which is passed through the machine.

Machines for fabric measurement and showing the prices therefor are old and well-known, examples of which appear in the patent to Hosch, No. 1,369,663, dated February 22, 1921, and in the patent to Vanderveld, No. 1,420,612, dated June 20, 1933.

In addition to accurate cloth measurement, with neither over nor under measurement, and with tables of cost for any measured length at a plurality of prices directly available and convenient for the clerk to consult, and operated by the measuring operation of the machine, it has been found very desirable to print and register the amount of the cloth measured and sold. This has been done previously and is shown in my Patent No. 1,943,711, issued January 16, 1934. With the measurement a ticket having printed thereon the length of the measurement is provided when, at the completion of a measuring operation, the machine is operated to cut the fabric at the place where it is to be severed from the rest of the bolt.

The present invention relates to improvements in connection with machines of the kind shown in my previous patent. It is a primary object and purpose of the present invention to provide machines of this type and character with practical means and mechanism whereby a single ticket only can be printed by the machine at the completion of a measuring operation, and so that no useful ticket can be printed on the machine except at the completion of a measuring operation and with the operation of the machine to certain predetermined points wherein the indication of cloth or fabric measured must consist in an amount which is one-eighth of a yard or a multiple thereof.

With the machine as now constructed and as I have produced it, means are provided wherein the notching of the cloth cannot take place unless an amount of either one-eighth of a yard or a multiple thereof has been measured, and no operation of the printing mechanism can take place except at such predetermined stated positions of the machine. This provides for accuracy in measurement and insures against either over or under measurement, providing the cloth has been properly started in the machine, which correct start is secured in the machine by a means which has no bearing on the present invention. Furthermore, the means or mechanism which has been provided is incapable of a second operation so as to print a second ticket after the one ticket has been printed. There is one place only where the printing mechanism may be operated to print tickets one after another and that is at the zero position of the indicators of the machine, which tickets are of no utility.

With such accessories to the fabric measuring and computing machine it is impossible for the clerk, in off times when not waiting on customers, to use the machine to print several tickets for different lengths and perhaps sell a customer a length of cloth measured some other way than on the machine itself and take one of the previously printed tickets and wrap it in the package containing the cloth. The printed ticket, of course, is for evidence both to the customer and the store of the amount which has been measured and sold, for guarding against complaints and for certainty with respect to what was measured and sold in the event of complaint. Therefore, it is very desirable and necessary that there shall be no possibility of a ticket which was printed at some other time being used to accompany a purchase and wherein the measurement of fabric actually delivered might be different from the printed ticket which went with it. My invention insures that an exact predetermined length of cloth such as is ordered will be measured and that such length of cloth will be indicated by the accompanying ticket which is printed at the end of the measurement.

An understanding of the invention may be had from the following description taken in connection with the accompanying drawings, in which:

Fig. 6 is a fragmentary transverse vertical section at one side of the machine and substantially on the plane indicated by the line 6 in Fig. 3, looking in the direction indicated.

Fig. 7 is a horizontal section illustrating a detail of the machine and in the position occupied when at zero, and Figs. 8 and 9 are fragmentary horizontal sections taken respectively at the planes indicated at 8 and at 9 in Fig. 3, looking downwardly in the direction indicated.

Like reference characters refer to like parts in the different figures of the drawings.

Figure 1:
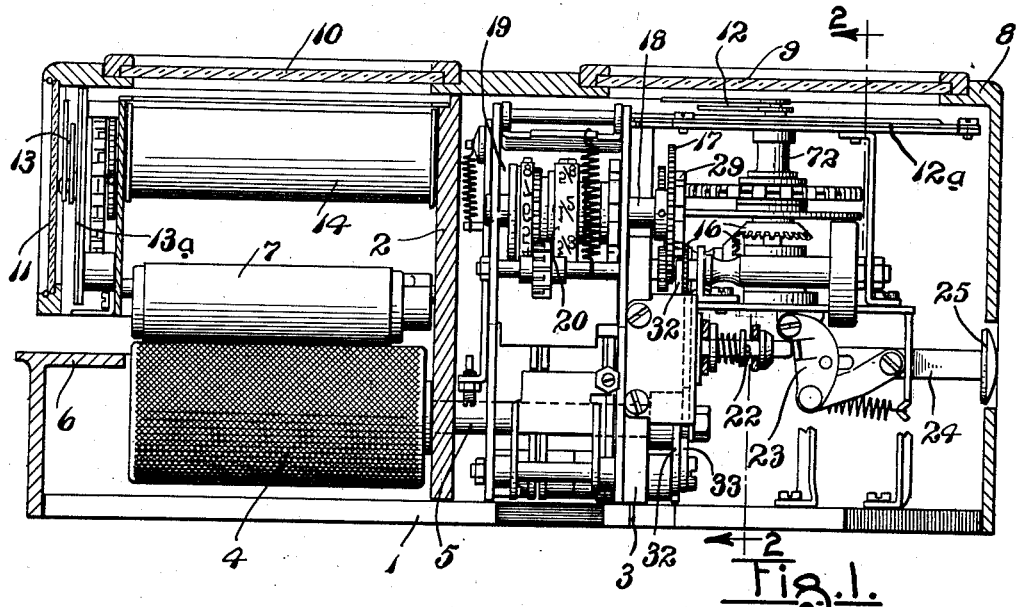
Fig. 1 is a longitudinal section and side elevation of a cloth measuring and computing machine equipped with my invention, the inner mechanism within the housing being shown substantially in elevation.

The machine includes a horizontal base plate 1 and two spaced apart vertical plates 2 and 3 which are secured to and extend upwardly from the plate 1. The measuring roller 4 is mounted for rotation and is secured to a shaft 5 which extends through and has bearing in the plates 2 and 3. The measuring roller is substantially housed within a housing member 6, the upper side of which provides a horizontal table over which the fabric is drawn, and which upper side has a slot or opening for the upper portion of the roller 4 to extend partly therethrough. The cloth is drawn over the measuring roller and is pressed thereagainst by a presser roller 7. The interior mechanism of the machine is housed within a housing 8 which has vertical sides, a substantially horizontal top and vertical ends, and in the housing are transparent windows 9, 10 and 11 at the positions best shown in Fig. 1. Underneath the window 9 measurement indicators or pointers 12, which move over an indicating dial 12a, are located. At the end of the machine which will face the customer, and back of the vertical window 11 are other indicating pointers 13 which move over an indicating dial 13a, while beneath the horizontal windows 10 the price computation chart mounted on a series of rollers, one of which is shown at 14, may be seen by looking downward, all in accordance with what has long been common practice and usage in this art and which is shown in the previously mentioned and other patents. The detail of driving the indicators and the charts by the measuring roller does not need to be herein again described as it is fully described in earlier patents.

The shaft 5 of the measuring roller 4 carries a pinion 15 which drives a train of gearing, the gears of which are indicated at 16, for driving the indicating pointers at 12; and also driving a gear 17 on a shaft 18 which extends into and is a part of a printing unit 19 located and secured between the vertical supporting plates 2 and 3, and which shaft 18 carries numbering rollers at 20, one of which carries indication of numbers from 0 to 12 inclusive, and the other of which carries fractions beginning with one-eighth and successively increasing by one-eighth yard differences. Machines of this kind normally have a capacity of measuring twelve yards and any measuring between zero and 12 yards may be performed on the machine. The detail of the printing mechanism is not here again described, as it is disclosed in my previously mentioned Patent No. 1,943,711.

Figure 2:
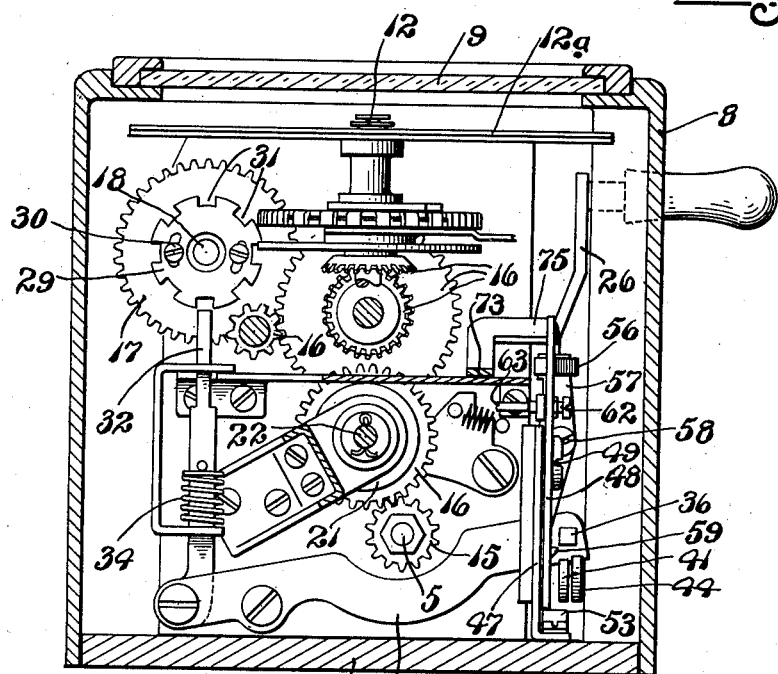
Fig. 2 is a transverse vertical section, the section being taken substantially on the plane of line 2—2 of Fig. 1, looking in the direction indicated.

In machines of this character, particularly those of the kind shown in the previously mentioned Hosch Patent No. 1,369,663, a clutch indicated at 21 in Fig. 2 is interposed in the train of gearing 16 for the purpose of disconnecting the measuring roller from the indicators and charts when, at the end of a measuring operation the measuring roller is to be freed for the indicators and charts to return to zero position. The clutch is disengaged by pressing upon the end of a rod 22. This is manually performed by operating a pressing lever 23 by an inward push on a bar 24 connected therewith, which bar has a head or button 25 at its outer end accessible through an opening in the housing 8 for manual operation. Also in machines of this type and character a cloth notching lever 26 is pivotally mounted at one side of the machine and carries a notching knife 27 normally in a position above the rear part of the so-called "throat" of the machine, that is, the space or slot in which the cloth moves between the measuring and pressure rollers. The lever 26 and the notching knife or blade 27 thereon is held in upper position, shown in Fig. 3, by a coiled spring 28, the spring yielding on downward pressure against the upper free end of the lever but returning the notching lever to upper position when released. The depression of the notching lever serves to operate the printing mechanism.

The structure so far described is old and well-known but is shown and described to the extent made for disclosing the environment wherein the present invention is applied. Such description has been more in a general than in a particular manner, as reference to the previously issued patents which have been mentioned will give full detail of the specific structure and operation of combined fabric measuring and computing machines of the type and character with which the present invention is to be incorporated.

With my invention a disk or wheel 29 is adjustably mounted on the face of the gear 17 through the slot and screw connection indicated at 30. The disk is provided with a consecutive series of spaced apart notches 31, eight in number. A bar 32 is mounted for vertical movement having pivotal connection at its lower end to one end of a bar 33 which is pivotally mounted between its ends and extends transversely of the machine. Normally the vertical bar 32 and the pivoted bar 33 occupy the position shown in Fig. 2 against the influence of a compression spring 34, and in such position the upper end of the bar 32 is below the path of movement of the periphery of disk 29. The bar 32 can be elevated only when a notch or opening 31 is properly positioned to receive the upper end of said bar. This occurs only at the zero position of the indicators and at any other position thereof which shows one-eighth of a yard or a multiple thereof. The disk 29 makes one complete revolution with each yard of fabric passed through the machine, and on operating the measuring roller with each succeeding additional one-eighth of a yard measured, a notch at 31 comes to a position so that the bar 32 may be lifted to enter such notch.

Figure 3:
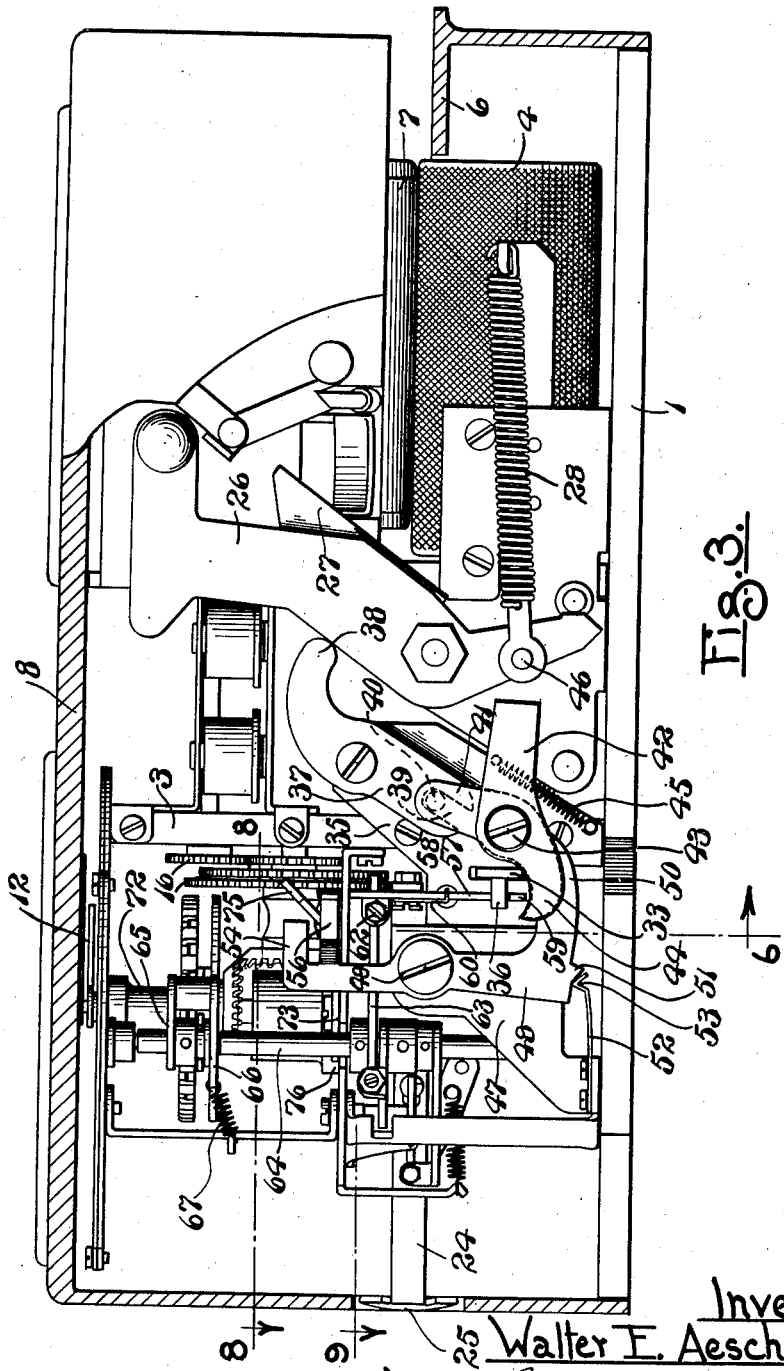
Fig. 3 is an enlarged longitudinal section and side elevation, similar to Fig. 1, at the opposite side of the machine, the inner mechanism being shown in elevation and parts of the casing being broken away and in section.
Figure 4:
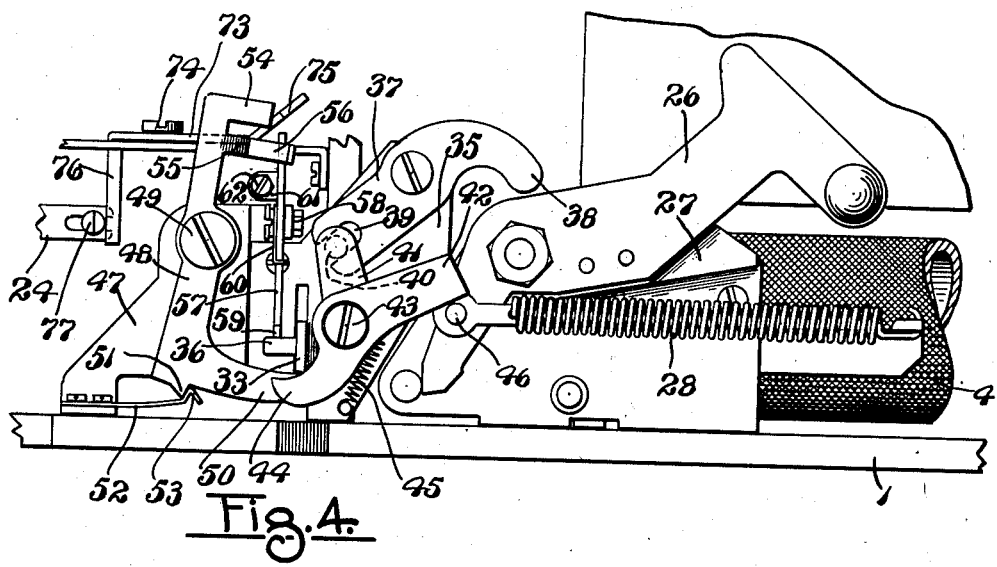
Fig. 4 is a fragmentary elevation similar to Fig. 3, showing the operation of the machine and the position of the parts when the notching lever is depressed at the end of a measuring operation.
Figure 5:
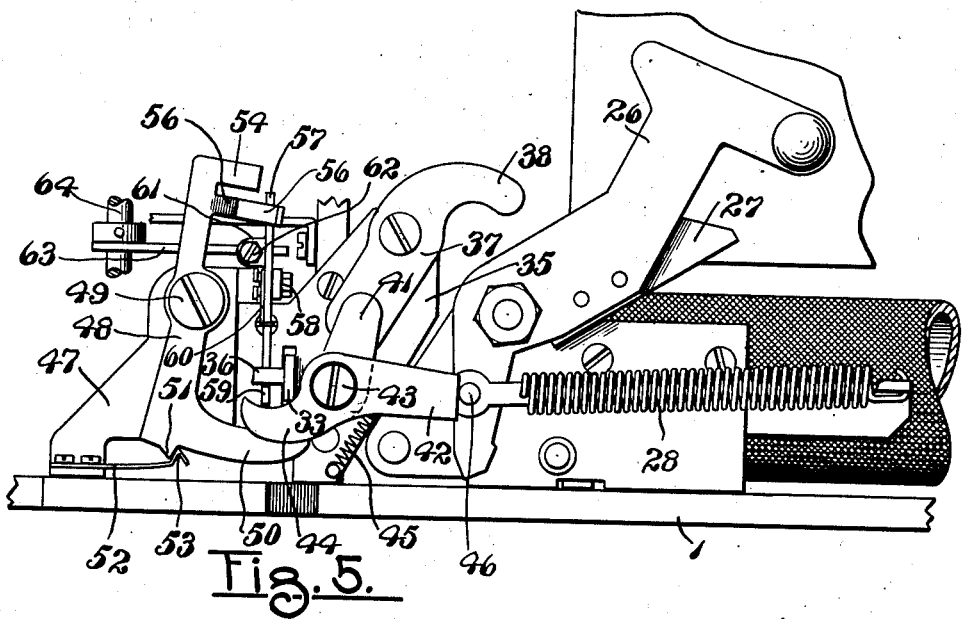
Fig. 5 is an elevation similar to Fig. 4 illustrating the position of the parts on an attempted second operation of the notching lever and attempted printing of a second ticket after the ticket has been printed, and illustrating the means preventing either notching the cloth or the printing of said second ticket.

The bar 33 at its free end portion passes through a vertical slot made in a supporting plate 35 (Figs. 6, 8 and 9) which is permanently secured to and at one side edge of the vertical supporting member 3 (Fig. 3). The end of bar 33 which extends through the plate is equipped with a laterally extending pin 36, preferably square in cross section, or at least having a flat underside. The plate 35 extends upwardly and inwardly as shown in Fig. 3 and near its upper end carries a lever 37 pivotally mounted thereon between its ends, the upper end portion 38 of which is curved upwardly and toward the edge of the cutting knife lever 26, and has a rounded end which rides against an inclined edge of said lever 26. The lower end portion of the lever 37 is longitudinally slotted for a short distance as shown in dotted lines at 39 in Fig. 3 to receive a pin 40 which extends to one side from the upper end of a lever 41 pivotally connected with a second lever 42 on the same pivot 43. The second lever 42 normally lies substantially horizontal as in Fig. 3, and at one end terminates in a finger 44 having a concaved upper edge. The corresponding end of the lever 41 is shaped like finger 44, the two finger portions of the two levers 41 and 42 lying side by side, and the free end portion of the bar 33 extending thereover. A coiled spring 45 is connected with the lever 42 tending to turn it in a clockwise direction and bring the upper edge of the finger portion 44 thereof against the under edge of the end of bar 33. The downwardly extending portion of the lever 26 below its pivotal mounting carries a pin 46 which lies in substantially horizontal alinement with the lever 42, such that when the pin is moved to the left on the operative movement of the notching lever 26, said pin strikes against the lever 42 and stops movement of the notching lever. The pin 46 is also used in making a connection of the spring 28 to the notching lever. A second supporting plate 47 is disposed at the left hand edge (Fig. 3) of the plate 35, has a permanent connection to the bottom plate 1 of the machine and at the vertical edge of the plate 35 is off-set and extends inside of said plate 35. A vertically positioned lever 48 is pivotally mounted between its ends at 49 on and at the outer side of the plate 47 (Figs. 4 and 5). At its lower end it has a laterally extending finger 50 which passes underneath the under edge of the free end of the bar 33, and at its lower end the lever 48 is provided with a triangular shaped dog 51. A leaf spring 52 is secured at one end to the foot member of the plate 47, where it is connected to the base plate 1, and is formed at its free end portion into an inverted V-shaped detent 53 which in the two positions of the lever 48 lies at opposite sides of the dog 51, being shown in one position in Fig. 3 and in another position in Figs. 4 and 5.

The upper end of lever 48 terminates in a horizontally extending finger 54 integral therewith, and a short distance below the finger 54 a horizontal arm projects in the same general direction but is bent inwardly for a short distance as indicated at 55 and then is bent outwardly at 56 as best shown in Fig. 8, it being evident that when the lever 48 is moved from the position in Fig. 3 to that in Fig. 4, said arm 56 and also the finger 54 are carried in a clockwise direction to the right for a short distance.

A latching lever 57 is pivotally mounted between its ends at 58 on the supporting plate 47. The lever is located substantially vertical and at its lower end is provided with a latching hook 59 (Fig. 6) which may come underneath the square pin 36. A light spring 60 normally moves the latching dog inwardly or to the position shown in Figs. 2 and 6 so that it will not come underneath said pin. A short distance above the pivot 58 the latching lever 57 is provided with a laterally extending ear 61 through which a screw 62 passes which may be adjusted to a predetermined position and locked in such position with the usual lock nut (Fig. 6).

An arm 63 (Fig. 9) is mounted on a vertical shaft 64 so as to move therewith. Said arm 63 is located in a horizontal plane and when the machine is at zero position the arm at its outer edge and adjacent its free end comes against the end of the screw 62 (Fig. 9). The rod 64 has mounted thereon a plate 65 connected permanently at its free end with the similar end of a parallel positioned lever 66 (Fig. 3), which lever is connected with the vertical shaft 64 at a point between its ends and is turned when free to do so by a light tension spring 67 in a counterclockwise direction (Fig. 7), turning the shaft 64 with it. The plate 65 has a projecting finger 69 which is engaged by a radially extending dog 70 on an arm 71 which is secured to and turns with a sleeve 72 at the upper end of which the yards or unit measurement indicating hand 12 is secured. In machines of this character one of the pointing hands 12 moves over the dial one complete revolution from the beginning of the measurement with the machine at zero position to the end of the measurement when the full capacity of twelve yards for the machine is reached. On the return or resetting of the machine by pushing inward on the push button at 25 the sleeve 72 turns through one revolution and when zero position is reached, the dog 70 has engaged with the finger 69 and rotated the shaft 64 in a clockwise direction, this bringing the edge of the bar 63 against the screw 62 as in Fig. 9. When a measuring operation is performed the rotation of the member 71 in a clockwise direction immediately begins to carry the dog 70 away from the finger 69. This movement rotates the plate 65 and shaft 64 in a counterclockwise direction whereupon arm 63 which is secured to the shaft 64, swings inwardly away from the screw 62 for a short distance or until the line of force of the spring 67 substantially comes to the axis of the shaft 64, whereupon the shaft 64 and connected parts thereafter remains stationary during continuing operation of the machine while it is measuring fabric. By the time that the machine has been operated sufficiently to indicate one-eighth of a yard in measurement, the arm 63 will have been moved away from the screw 62 to substantially the position which it occupies during any succeeding measurement greater than one-eighth of a yard. It will be noted that the upper end of the latching lever 57 is in a position such that when the angularly positioned part 56 is in a position to be moved to the right, it bears against said latching lever and swings it a limited distance to bring the latching hook 59 to position to engage underneath the pin 36.

A lever 73 is pivotally mounted between its ends at 74 on a horizontal supporting plate in the machine which plate is located at a level slightly below the lower edge of the parts 55 and 56. One end of said lever is inclined upwardly and terminates in a forwardly extending finger 75 which extends out far enough that when lever 48 is turned from the position shown in Fig. 3 to that shown in Fig. 4 the free end of the finger 54 comes very nearly to the adjacent edge of the finger 75 (Fig. 4). At the opposite side of the pivot 74 the lever 73 is bent to extend vertically downward in an arm 76 which passes through a suitable opening in the supporting plate. The lower end of the vertical arm 76 lies immediately within the inner side of a pin 77 which is moved to the right (Fig. 9) on inward pressure against the push button at 25 to move the bar 24 inwardly and disengage clutch 21. This causes the lever 73 to be turned with a clockwise movement and occurs when the button at 25 is pressed for resetting the machine. The pin 77 is a part of the structure of old machines being utilized therein as a retaining dog engageable with a latching lever 78 to hold the reset bar 24 at inner position and maintain the clutch at 21 disengaged until the machine has been reset to zero indicating position.

In the operation of the machine, in order that the notching lever 26 may be depressed, it is essential that a notch 31 in the disk 29 be in a position to receive the upper end of the bar 32. If it is not the bar 33 cannot be lowered at its free end. If a notch 31 does receive the upper end of bar 32, under the pressure of the spring 34, bar 33 is moved in a clockwise direction and engages with the finger 44 of the stop lever 42 and turns it counterclockwise to lift the end adjacent the pin 46 to an upper level such that the pin can pass underneath it. It is only when the pin 46 can thus pass underneath the end of the stop lever 42 that the notching lever may be operated. The operation of the notching lever in addition to notching the cloth also operates the printing mechanism to print the ticket, and such printing is prevented unless the notching lever may be moved downwardly to its lowermost position, this appearing fully in my previous patent to which reference has been made.

Therefore in operating the machine it is incumbent upon the clerk to measure either substantially exactly one-eighth of a yard, one-quarter of a yard or some other multiple of one-eighth of a yard. At any position of the measurement such that the indicators point to one-eighth of a yard or a multiple thereof, the upper end of the bar 32 may be elevated as it will be received in a notch 31 in the disk 29. The notching lever is thereupon moved to its lowermost position with a consequent operation of the ticket printing unit 19; and the ticket is printed in correspondence with the amount shown on the indicators of the machine. Upon the starting of a measuring operation the arm 63 (Fig. 9) moves inwardly away from the screw 62 and thereupon frees the latching lever 57. On the downward movement of the notching lever 26 the end 38 of lever 37 follows the notching lever, lever 37 turns in a clockwise direction thereby turning the lever 41 in a counterclockwise direction and lowering the finger portion thereof which is inside of the finger 44, and the bar 33 turns about its pivot under the force of the spring 34 with a resultant elevation of bar 32 and a downward movement of the free end of the lever 33. Such downward movement of the free end of lever 33 it being in contact with lever 44 which is pivoted at 43, swings the stop lever 42 in a counterclockwise direction and lifts the end thereof adjacent the pin 46 to an upper position so that the pin may pass underneath, permitting full downward movement of the notching lever.

Substantially when the notching lever reaches its lowermost position and the free end of the pivoted bar 33 has lowered to its lowermost position it engages the part 50 on the lever 48 and swings such lever a limited distance clockwise, carrying the dog 51 over the spring detent 53 from the position in Fig. 3 to that shown in Fig. 4. The relative position of the stop pin 46 with respect to the stop lever 42 is such that if the dog 51 tends to come to a stop just as it is passing over the upper point of the detent at 53, said pin 46 engages underneath the lower edge of the lever 42 and turns it a little farther and overcomes the spring 45 so that dog 51 will pass across the detent to the position shown in Fig. 4.

With the movement of the lever 48 from the position shown in Fig. 3 to that shown in Fig. 4 as described, the inclined part 56 bears against the upper end portion of the latching lever 57 swinging it inwardly and moving the latching hook 59 outwardly. Then upon release of the notching lever to return to its upper position under the force of spring 28 and with a consequent riding of the curved end of the part 38 on the inclined cam edge of the notching lever, the member 41 is swung back to its original position and having its hook portion extending underneath the free end of bar 33, lifts the bar with a compression of the spring 34 and the pin 36 rides over the hook 59 so that the hook comes beneath the lower flat side of said pin 36. If it is then attempted, before resetting the machine, to again operate the notching lever and as a consequence the ticket printing mechanism, the notching lever will merely move away from the part 38, as shown in Fig. 5, because the latching hook at 59 holds bar 33 from downward movement and does not permit the compression spring 34 to operate the parts as in the first operation after a measurement has been completed. Theer can be no second operation of the printing mechanism for the reason that the various parts 37, 41 and 42 are held in the position shown in Fig. 5, and the pin 46 coming against the end of the lever 42 stops the downward movement of the notching lever; and there can be no operation of the machine until it has been reset to zero.

As has been previously noted, the movement of the lever 48 to the position shown in Fig. 5 brings the end of the finger 54 closely adjacent the edge of the finger 75 of lever 73. Resetting to zero is accomplished by pushing inward on the push button 25 with a consequent inward movement of the pin 77. Such inward movement of pin 77 engages it against the downwardly extending arm 76 of the lever 73, turns said lever 73 in a clockwise direction and the finger 75 comes against the finger 54, turning the lever 48 back to its original position or that shown in Fig. 3 with the dog at 51 changed from one side of the detent 53 to the other. And with such movement the part 56 moves away from the latching lever 57, which under the influence of the spring 60 moves inwardly at its lower end to the position shown in Fig. 6, making the latching hook 59 inoperative to hold the pin 36.

It is apparent therefore that at all positions away from the zero position of the machine the depression of the notching lever or consequent printing of a ticket can occur only at measurements at one-eighth of a yard or a multiple thereof, and that one ticket only can be printed. This is not true of the zero position of the machine. In such position the arm 63 is as shown in Fig. 9 so that the latching lever 57 cannot be moved to operative position with the latching hook located to pass underneath the pin 36. The printing operation may be performed successively with the machine at zero position. This is neither an advantage nor disadvantage. There is nothing to be gained by printing tickets which show zero measurement. There is no incentive for a clerk to print such tickets. The primary result and effect wanted with my invention and which my invention attains very successfully is inability to print more than one useful ticket for a measurement which has been performed, and inability to print tickets one after another for certain measurements for use later when no actual cloth measurement on the machine takes place.

The invention described is very practical and useful and has been completely and successfully manufactured and is in practical use. The claims appended hereto define the invention which is to be considered comprehensive of all forms of structure coming within their scope.

I claim:

1. In a fabric measuring machine, a measuring roller adapted to be driven by fabric drawn through the machine, a ticket printing mechanism associated with the measuring roller for printing the amount of fabric that is drawn through the machine at the end of a measuring operation, a notching knife adapted to be manually operated to notch the cloth at the end of a measuring operation, means controlled by the operation of the notching knife for printing the ticket, a stop normally in the path of movement of the notching knife, means for moving the stop out of the path of movement of the notching knife at any of a definite series of predetermined positions of the measuring machine to which operated by the cloth, and means for rendering said stop removal means ineffective upon an attempted successive operation of the notching knife at the same predetermined position of the machine.

2. In a fabric measuring machine having a measuring roller adapted to be rotated by lineal movement of fabric through the machine, a notching knife to notch the fabric at the completion of a measuring operation, a sales ticket mechanism operated by the notching knife to print a ticket simultaneously with the notching of the fabric, means preventing operation of the notching knife after the measuring roller has been turned except at predetermined positions of the roller, including a movable stop which in normal position allows only a slight initial movement of the notching knife, means for moving said stop away from its normal position on said initial movement of the notching knife at the completion of a measuring operation, and means operated by a return of the knife to original position for moving the stop means to operative position and maintaining the same upon an attempted succeeding operation of the notching knife at the same position of the machine whereby said stop prevents a second operation of the notching knife and consequent printing of a duplicate ticket.

3. In a fabric measuring machine having a measuring roller adapted to be rotated by lineal movement of fabric through the machine, a notching knife to notch the fabric at the completion of a measuring operation, a sales ticket mechanism operated by the notching knife to print a ticket when said fabric is notched, a movable stop normally interposed in the path of movement of said knife, and means engaging with said stop upon a slight initial movement of said knife for preventing a second operation of the notching knife in succession at the same position of the machine.

4. In a fabric measuring machine, a measuring roller adapted to be driven by fabric drawn through the machine, a ticket printing mechanism including a shaft driven by the measuring roller, with numbering wheels on said shaft, a manually operable notching knife to notch the cloth at the end of the measuring operation, the operation of said notching knife also operating to print a ticket against said numbering rollers, a wheel on said shaft having a plurality of spaced apart notches therein, a movable member normally urged toward but held away from said wheel, means released by the notching knife operation whereby said member is moved and enters a recess in the wheel when said wheel is in any one of a number of predetermined positions such that the recess will receive the member, a movable stop positioned normally to allow only a small initial operation of the notching knife, said stop being operated by said member when the member is moved into a recess of said wheel to move the stop out of the way of the notching knife to thereby permit operation of the notching knife at the end of a measuring operation and at a predetermined position of said wheel.

5. A construction containing the elements in combination defined in claim 4, combined with a latch to engage with said stop operating means on a first operation of the notching knife to hold the same in position to prevent its moving the stop, whereby the stop upon an attempted second operation of the notching knife prevents such operation.

6. In a fabric measuring machine, a measuring roller adapted to be driven by fabric drawn through the machine, a ticket printing mechanism including a shaft driven by the measuring roller, with numbering wheels on said shaft, a wheel on said shaft having a plurality of equally spaced recesses in its periphery, a longitudinally movable bar mounted in the same plane with the wheel and adapted to be moved to have an end thereof enter a notch in the wheel when said wheel is at any one of a number of predetermined positions, a spring urging the bar toward the wheel, a pivoted bar connected to the opposite end of the first bar, said pivoted bar being pivotally mounted between its ends, a stop lever having one end thereof extending under the opposite end of said pivoted bar, a notching knife adapted to be manually operated to notch the cloth at the end of a measuring operation and also operating the printing ticket mechanism against said numbering rollers to print a ticket, means operated by a small initial movement of the notching knife for releasing said pivoted bar whereby the pivoted bar moves said stop lever to an inoperative position, said stop lever in normal position having a portion engaging said notching knife to prevent operation of the notching lever, beyond said small initial movement.

7. A construction containing the elements in combination defined in claim 6, combined with a latch engaging with the free end portion of said pivoted bar to hold the same from pivotal movement, means for moving said latch into operative connection with said bar on operation of the notching lever and return thereof to initial position, whereby said stop lever remains in its normal position and prevents a second successive operation of the notching lever and consequent printing of a duplicate ticket.

8. A fabric measuring machine having a measuring roller adapted to be driven by fabric drawn through the machine, a notching knife to notch cloth at the end of a measuring operation, a manually operable reset bar adapted to be pushed inwardly to reset the machine after a measuring operation, and a ticket printing mechanism operated by the notching knife, a movable stop normally interposed in the path of movement of the notching knife to allow only a partial movement thereof, means actuated, upon partial movement of the notching knife, for moving the stop to inoperative position whereby the notching knife may be operated through a full stroke and thereby print a ticket, and latch means rendered effective by movement of said knife for engaging with said stop moving means after it, the knife, and stop have been returned to initial position, to hold and stop operating means against movement whereby the stop prevents a second successive operation of the notching knife and consequent printing of a duplicate ticket.

9. A construction containing the elements in combination defined in claim 8, combined with means operable upon resetting the machine to disconnect said latch from said stop operating means.

10. A fabric measuring machine having a measuring roller adapted to be driven by fabric drawn through the machine, a ticket printing mechanism including a shaft driven by the measuring roller, with numbering wheels on said shaft, a notching knife to be manually operated to notch the cloth at the end of a measuring operation, and means for printing a ticket against said numbering rollers when the notching knife is operated, stop means having a normal position in which it allows only a partial operation of the notching knife, means actuated, upon the partial operation of the notching knife, to move said stop means away from its normal position whereby the notching knife may be operated through a full stroke and thereby print a ticket at the end of a measuring operation, latching means rendered effective by movement of said knife for engaging with the stop moving means after it, the knife, and stop have been returned to initial position, to hold said stop moving means against movement whereby the stop prevents a second operation of the notching knife in succession, resetting means, and means operated by the resetting of the machine for releasing said latch, as and for the purposes specified.

11. In a fabric measuring machine, means for notching the fabric at the completion of a measuring operation, a sales ticket printing mechanism actuated by a complete operation of the notching means, means preventing a second complete operation of the notching means in succession at the same measuring position of the machine, and means rendering said prevention means ineffective on resetting the machine to initial position.

12. In a fabric measuring machine having a measuring roller adapted to be rotated by lineal movement of fabric pressed thereagainst, a measurement indicator operated by said measuring roller, a ticket printing mechanism, a manually operable notching knife to notch the fabric and means preventing complete operation of the notching knife more than once when the measurement indicator shows that one-eighth of a yard of fabric or a multiple of said one-eighth of a yard has been drawn through the machine against said measuring roller, to prevent printing more than one ticket for each measuring operation.

13. In a fabric measuring machine, a measuring roller adapted to be driven by fabric drawn through the machine, a ticket printing mechanism including a shaft driven by the measuring roller with numbering wheels on said shaft, a notching knife adapted to be manually operated to notch the fabric at the end of the measuring operation, means for printing a ticket against said numbering wheels when the notching knife is operated, stop means having a normal position in which it allows only a slight initial movement of the knife, stop moving means actuated by said initial movement of the knife to move said stop means away from its normal position to allow a complete operation of the knife, and latching means adapted to engage with said stop moving means upon the slight initial movement of the knife whereby a second operation of the notching knife in succession at the same position of the measuring roller and consequent printing of a duplicate ticket is prevented.

WALTER E. AESCHBACH.